(12) United States Patent
Shukunami et al.

(10) Patent No.: US 7,400,444 B2
(45) Date of Patent: Jul. 15, 2008

(54) OPTICAL AMPLIFIER AND CONTROL METHOD FOR OPTICAL AMPLIFIER

(75) Inventors: Norifumi Shukunami, Yokohama (JP); Tomoto Tanaka, Yokohama (JP); Mayumi Naito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/824,576

(22) Filed: Apr. 15, 2004

(65) Prior Publication Data

US 2005/0105170 A1    May 19, 2005

(30) Foreign Application Priority Data

Nov. 17, 2003  (JP) ............... 2003-386456

(51) Int. Cl.
  *H01S 3/00*  (2006.01)
(52) U.S. Cl. ............................... 359/341.41
(58) Field of Classification Search ............ 359/341.41
See application file for complete search history.

(56) References Cited

U.S. PATENT DOCUMENTS

| | | | |
|---|---|---|---|
| 5,907,429 A | 5/1999 | Sugata | 359/371.12 |
| 6,335,821 B1* | 1/2002 | Suzuki et al. | 359/337.11 |
| 6,366,395 B1* | 4/2002 | Drake et al. | 359/341.41 |
| 6,411,430 B1* | 6/2002 | Ogino et al. | 359/337.11 |
| 6,621,623 B1* | 9/2003 | Okuno | 359/341.1 |
| 6,639,716 B1 | 10/2003 | Tomofuji | 359/371.2 |
| 6,738,185 B2* | 5/2004 | Nakaji | 359/341.41 |
| 6,879,437 B2* | 4/2005 | Sandell et al. | 359/341.41 |
| 2001/0040720 A1* | 11/2001 | Gerrish et al. | 359/341.4 |
| 2004/0240044 A1* | 12/2004 | Park et al. | 359/341.41 |

FOREIGN PATENT DOCUMENTS

| | | |
|---|---|---|
| JP | 10-262032 | 9/1998 |
| JP | 11-112434 | 4/1999 |
| JP | 2000-232433 | 8/2000 |
| JP | 2000-299518 | 10/2000 |

\* cited by examiner

*Primary Examiner*—Deandra M Hughes
(74) *Attorney, Agent, or Firm*—Staas & Halsey LLP

(57) ABSTRACT

An amount of ASE generated changes due to a temperature and respective powers of signals input to and output from an optical amplifying unit, causing a fluctuation of a gain of the optical amplifying unit. A photodiode on an input side and a photodiode on an output side detect the input and output powers, and temperature detecting unit detects an operating temperature of the optical amplifier. A control unit corrects the amount of ASE generated, based on at least one of the detected input and output signal powers and on the detected temperature according to AGC control, which controls driving of an excitation LD for the optical amplifier to keep a gain of the optical amplifier constant.

4 Claims, 10 Drawing Sheets

OPTICAL AMPLIFIER AND CONTROL METHOD FOR OPTICAL AMPLIFIER

CROSS-REFERENCE TO RELATED APPLICATIONS

This application is based upon and claims the benefit of priority from the prior Japanese Patent Application No. 2003-386456, filed on Nov. 17, 2003, the entire contents of which are incorporated herein by reference.

BACKGROUND OF THE INVENTION

1) Field of the Invention

The present invention relates to a technology for compensating an optical fiber transmission loss and an optical functional device loss.

2) Description of the Related Art

Optical amplifiers are used in the optical communication systems for compensating the optical fiber transmission loss and the optical function device loss. In recent years, there has been a sudden increase in the demand for the optical communications along with the spread of the Internet. As a result, the optical amplifiers have found their use even in wavelength multiplex optical communication (WDM) systems because of their wide band characteristics. Moreover, as the technology matures, the optical amplifiers are being used not only in the long-distance trunks but also in the metropolitan ring networks.

The optical amplifiers are broadly divided into rare earth-doped optical fiber amplifiers, semiconductor optical amplifiers (SOA), optical fiber Raman amplifiers and the like. The rare earths used in the rare earth-doped optical fiber amplifiers include Er (erbium) for amplifying in a band of 1525 nanometer (nm) to 1625 nm, Tm (thulium) for amplifying in a band of 1480 nm to 1510 nm, and Pr (praseodymium) for amplifying in a band of 1300 nm. Currently, the Er-doped optical fiber amplifiers (EDFA) are the main stream in the optical communication systems (for example, see Japanese Patent Application Laid-Open Publication Nos. 2000-299518, H10-262032, H11-112434, and 2000-232433).

Conventionally, control methods for the optical amplifiers include ALC control (Automatic Level Control) in which the optical output is controlled, AGC control (Automatic Gain Control) in which the gain is controlled, APC (Automatic Power Control) and ACC (Automatic Current Control) in which the excitation light or the excitation current is controlled.

Figure 9:
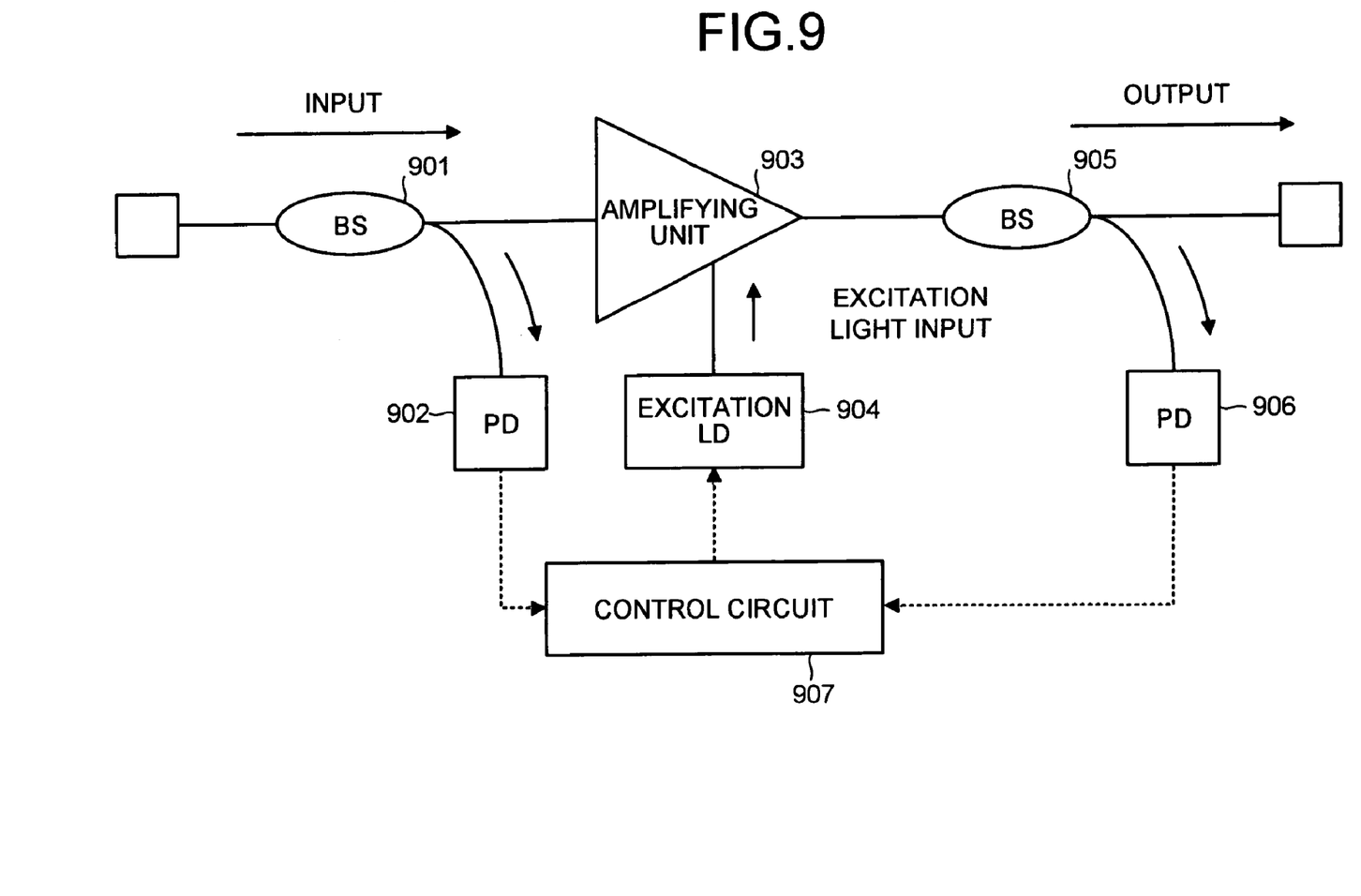
FIG. 9 is to explain a control method of a general optical amplifier.

FIG. 9 is a diagram to explain a general control method for an optical amplifier. A part of an input optical signal is branched by a beam splitter (BS) 901, and a photodiode (PD) 902 detects an input level of the optical signal input. One optical signal output from the BS 901 is input into an amplifying unit 903, and the amplifying unit 903 amplifies the optical signal by using excitation light of an excitation laser diode (LD) 904. On an output side of the amplifying unit 903, the optical signal is branched by a beam splitter (BS) 905, and a photodiode (PD) 906 detects an output level of the optical signal. In the AGC control, the light levels detected by the PD 902 on the input side and by the PD 906 on the output side are input into a control circuit 907 and the control circuit 907 controls excitation light of the excitation LD 904 in such a manner that the light has a predetermined and fixed gain. On the contrary, in the ALC control, the excitation light is controlled in such a manner that the light level detected by the PD 906 on the output side becomes a set light output level.

Figure 10:
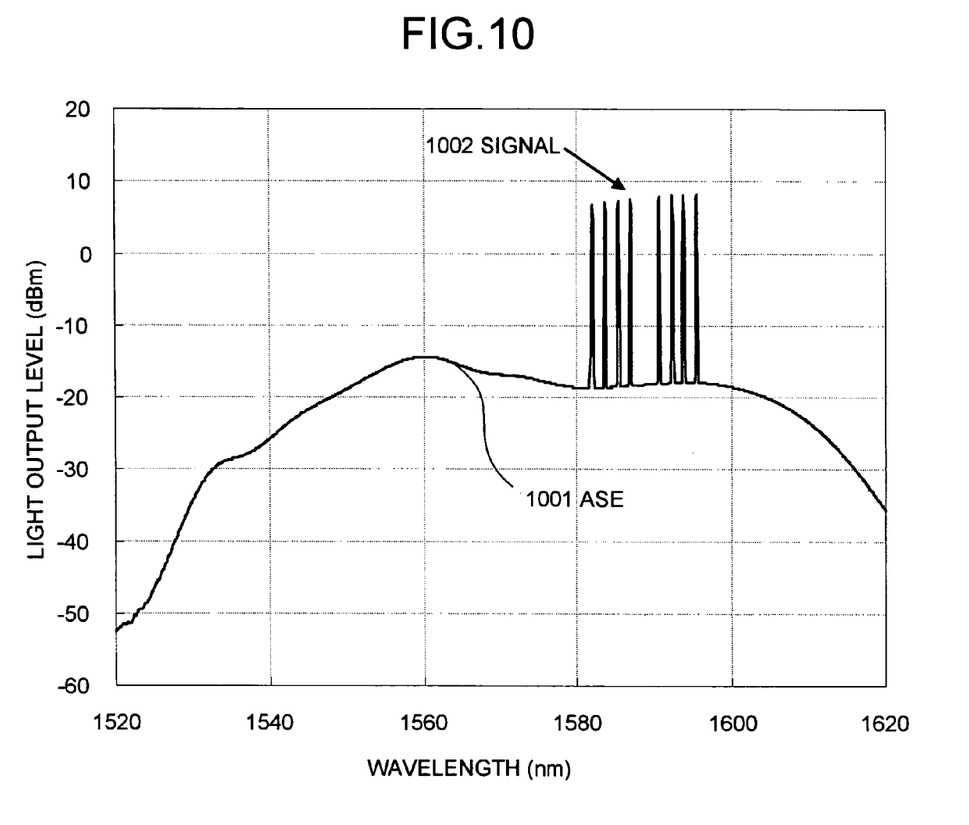
FIG. 10 is a graph to explain the amplified spontaneous emission (ASE) light of an optical amplifier.

FIG. 10 is a graph to explain the amplified spontaneous emission light of an optical amplifier. When the optical amplifier amplifies a signal, it generates amplified spontaneous emission (ASE) light. The wavelength (nm) is plotted along the horizontal axis and the light output level is plotted along the vertical axis. An ASE 1001 occurs in a wavelength band wider than a wavelength band of a signal 1002. Since the PD 906 simultaneously detects both the signal 1002 and the ASE 1001, it is necessary to correct the ASE 1001 to obtain more accurately set signal gain or signal output.

In the AGC control, the correction of the ASE 1001 is carried out by two approaches. One approach is to add a corrected voltage of the ASE 1001 to a voltage output by the PD 902 to obtain a gain set in comparison with the voltage of the PD 906. Another approach is to subtract the corrected voltage of the ASE 1001 from the voltage of the PD 902 and the voltage of the PD 906 so as to obtain a set gain.

Conventionally, amplitude of the corrected voltage of the ASE is constant with respect to the set gain and output. An amount of the ASE generated greatly changes due to amplifying conditions such as the temperature of the optical amplifying unit, the power of the input signal, the power of the output signal, the power of the excitation light. As a result, although the signal gain is set to a constant value, because the ASE power is temperature dependent, the gain changes with the temperature. Similarly, the gain also changes with the power of the input signal.

SUMMARY OF THE INVENTION

It is an object of the present invention to solve at least the problems in the conventional technology.

An optical amplifier according to an aspect of the present invention includes an input power detecting unit that detects an input power of an optical signal; an output power detecting unit that detects an output power of the optical signal; an optical amplifying unit that amplifies the optical signal; a change factor detecting unit that detects a factor that causes a gain of the optical amplifying unit to change; and a control unit that controls, based on the input power, the output power, and the factor, so that the gain of the optical amplifying unit becomes constant.

A control method for an optical amplifier according to another aspect of the present invention includes detecting an input power of an optical signal; detecting an output power of the optical signal; amplifying the optical signal; detecting a factor that causes a gain of the optical amplifying unit to change; and providing a control, based on the input power, the output power, and the factor, so that the gain of the optical amplifying unit becomes constant.

The other objects, features, and advantages of the present invention are specifically set forth in or will become apparent from the following detailed descriptions of the invention when read in conjunction with the accompanying drawings.

DETAILED DESCRIPTION

Exemplary embodiments of an optical amplifier and a control method for the optical amplifier according to the present invention are explained below in detail with reference to the accompanying drawings.

Figure 1:
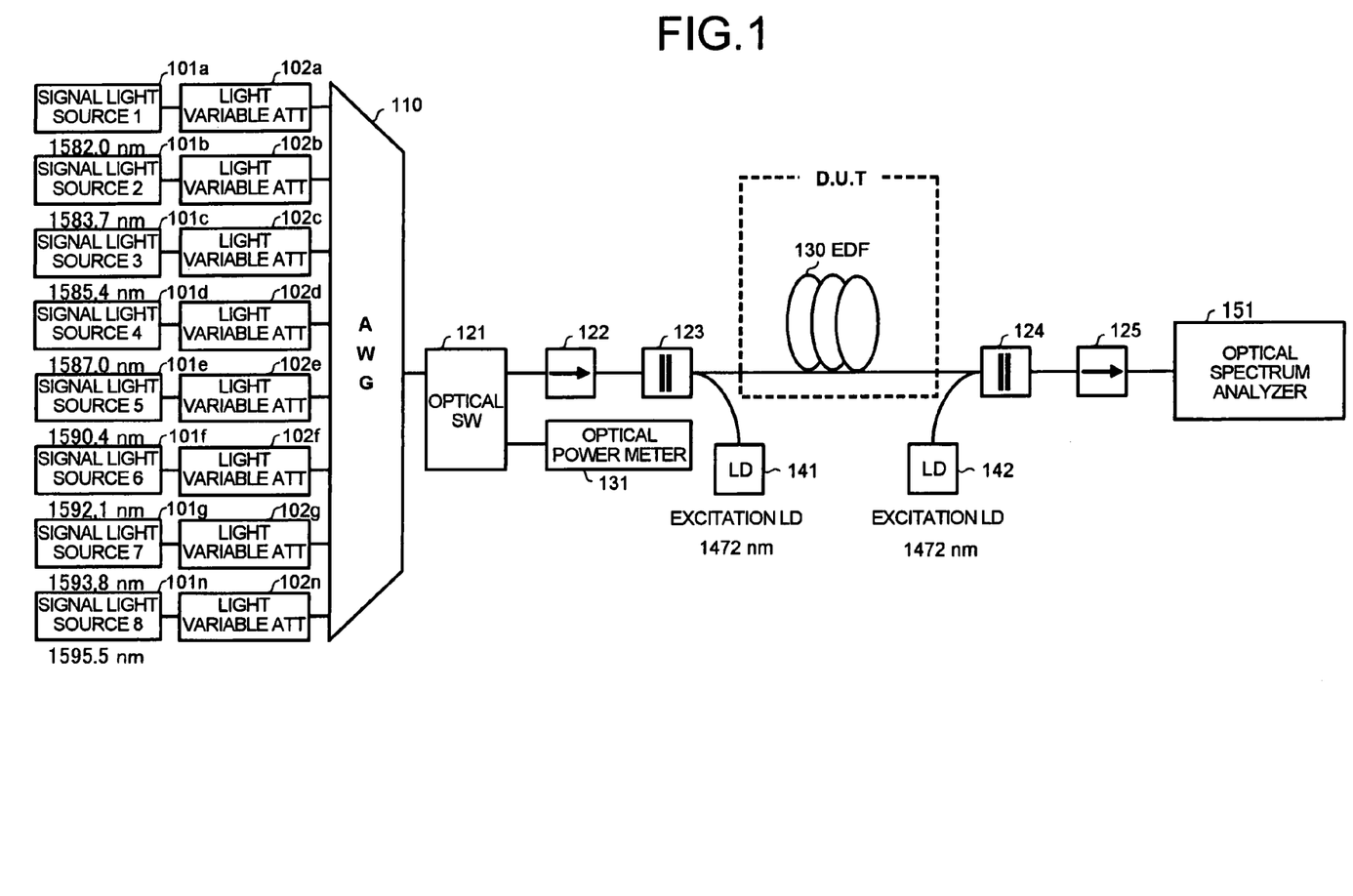
FIG. 1 is a block diagram of a measuring system for measuring various characteristics of ASE power.

First, various characteristics of ASE will be explained below. FIG. 1 is a block diagram of a measuring system for measuring various characteristics of ASE power. A plurality of signal light sources 101 (101a to 101n) output optical signals having different wavelengths, and light variable attenuators (ATT) 102 (102a to 102n) adjust the optical signal outputs. An arrayed waveguide grating (AWG) 110 multiplexes the optical signals. The multiplexed optical signal is output to an optical switch (SW) 121, an optical isolator 122, and a WDM filter 123.

The optical switch 121 switches the input optical signal between sides of an EDF 130, which is an element to be tested (D.U.T), or an optical power meter 131. The optical power meter 131 detects an optical power of the optical signal with a bandwidth of, for example, 1.55 micrometer (μm) (1582.0 nm to 1595.5 nm) supplied from the optical signal sources 101a to 101n. The WDM filter 123 multiplexes the optical signal with a bandwidth of, for example, 1.55 μm (1582.0 nm to 1595.5 nm) supplied from the signal light sources 101a to 101n and an optical signal of, for example, 1472 nm from an excitation LD 141 so as to supply the multiplexed optical signal to one end of the EDF 130.

A WDM filter 124 and an excitation LD 142 are provided on the other end of the EDF 130. An output of the WDM filter 124 is output to an optical spectrum analyzer 151 via an optical isolator 125. The optical spectrum analyzer 151 measures optical power for each of the wavelengths of the input optical signal.

Figure 2:
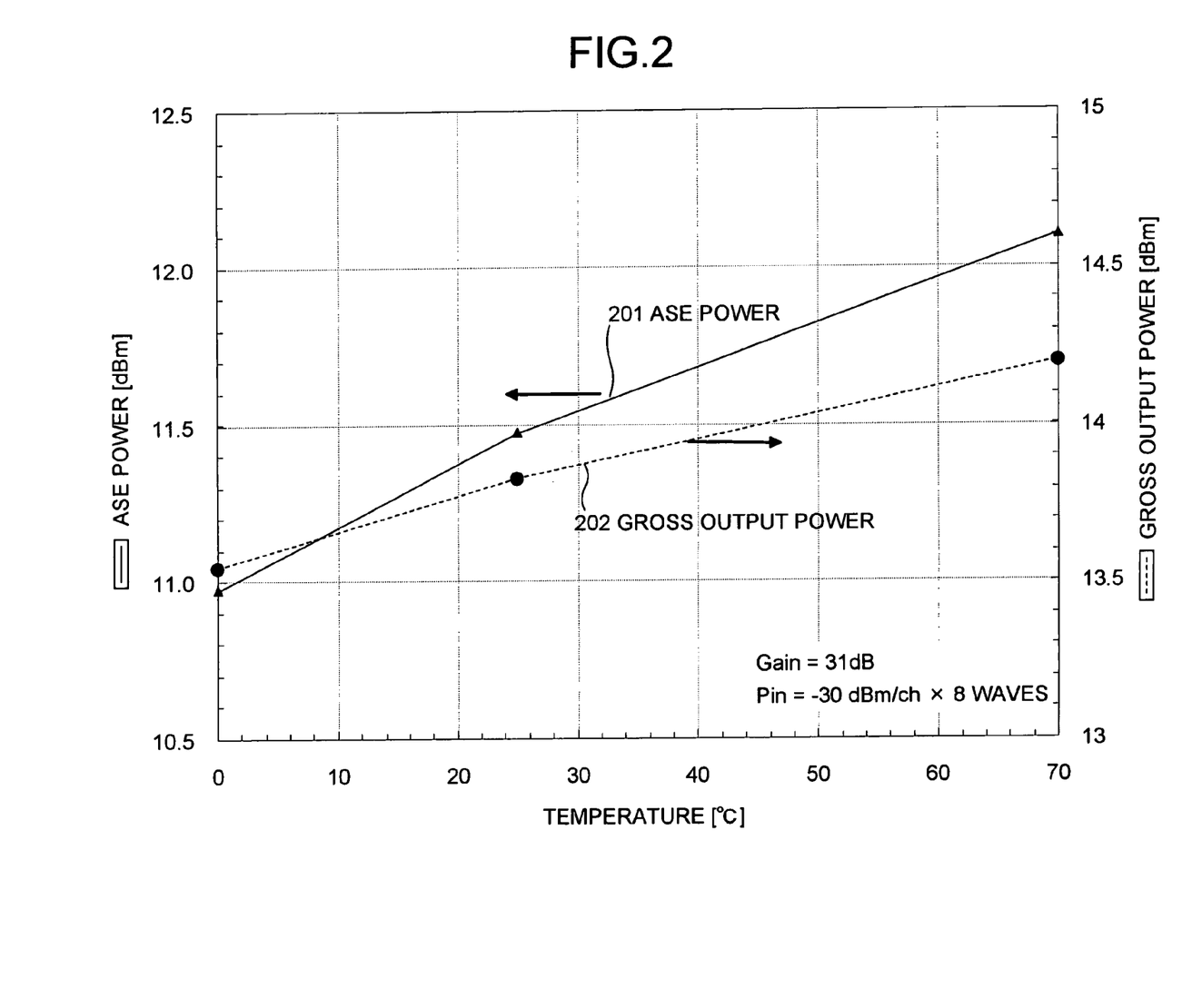
FIG. 2 is a graph to explain the temperature dependencies of both a ASE power of EDF and a gross output power obtained by adding a signal output power and the ASE power.

FIG. 2 is a graph to explain the temperature dependencies of both the ASE power of EDF and a gross output power obtained by adding the signal output power and the ASE power. The temperature is plotted along the horizontal axis, the ASE power 201 (solid line) and the gross output power 202 (dotted line) are plotted along the vertical axis. The graph is a plot of the results obtained in an experiment using the measuring system shown in FIG. 1. In this experiment, the optical power meter 131 was used to measure the input power of the optical signal, and the optical spectrum analyzer 151 was used to measure the output power under the condition that the gross signal input power was −21 dBm and the gain was 31 dB. It can be confirmed from the graph that, although the signal gain was constant (31 dB), the ASE power 201 has the temperature dependency, so that the gross output power 202 changed from 11.0 dBm to 12.1 dBm within a range of 0° C. to 70° C. Because of the temperature dependency of the EDF 130, there occurs a gain error of 13.5 dB to 14.2 dB if the AGC control is performed using only the gross output power 202 detected.

Figure 3:
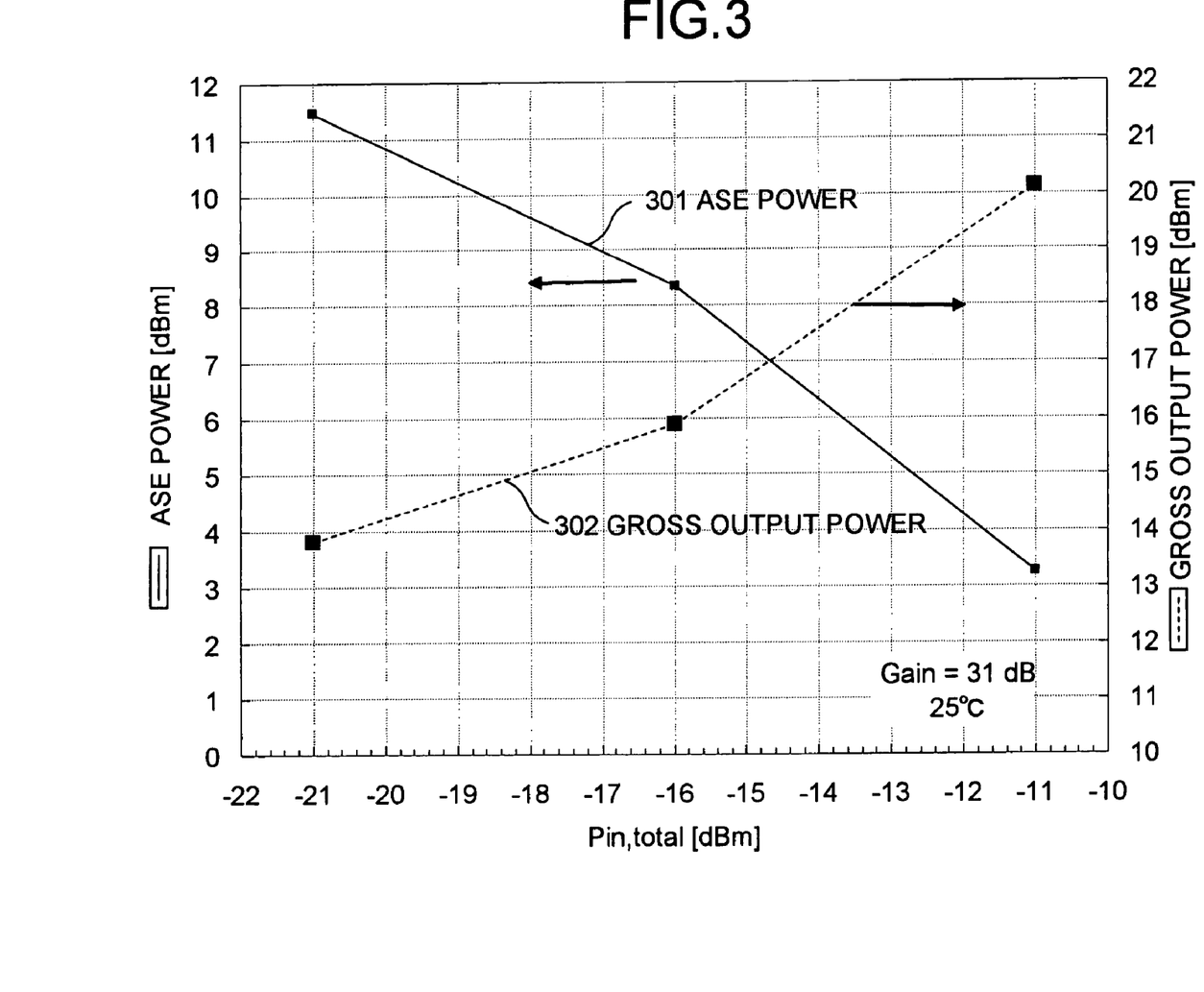
FIG. 3 is a graph to explain the signal input power dependencies of both the ASE power of EDF and the gross output power.

FIG. 3 is a graph to explain the signal input power dependency of the ASE power of EDF and the gross output power. A gross input power 302 (Pin, total) is plotted along the horizontal axis, an ASE power 301 (solid line) and a gross output power 302 (dotted line) are plotted along the vertical axis. The gain was constant (31 dB), and the temperature was 25° C. As the gross input power was changed from −21 dBm to −11 dBm, the ASE power 301 changed from 11.5 dBm to 3 dBm. If an ASE amount of 11.5 dBm, when the gross input power was −21 dBm, is made fixed and ASE correction is performed, a target gross output when the gross input power is −16 dBm becomes:

$$10 \times \log [10^{(11.5/10)} + 10^{((-16+31)/10)}] = 16.6 \text{ dBm}.$$

When the actual signal gain is 31 dB, however, the gross output power 302 is 15.9 dBm, and thus the gain error of about 0.7 db is generated. Similarly when the signal input power is −16 dBm, the gain error of about 0.7 dB is generated. In other words, the ASE power 301 is directly proportional to the gain.

Figure 4:
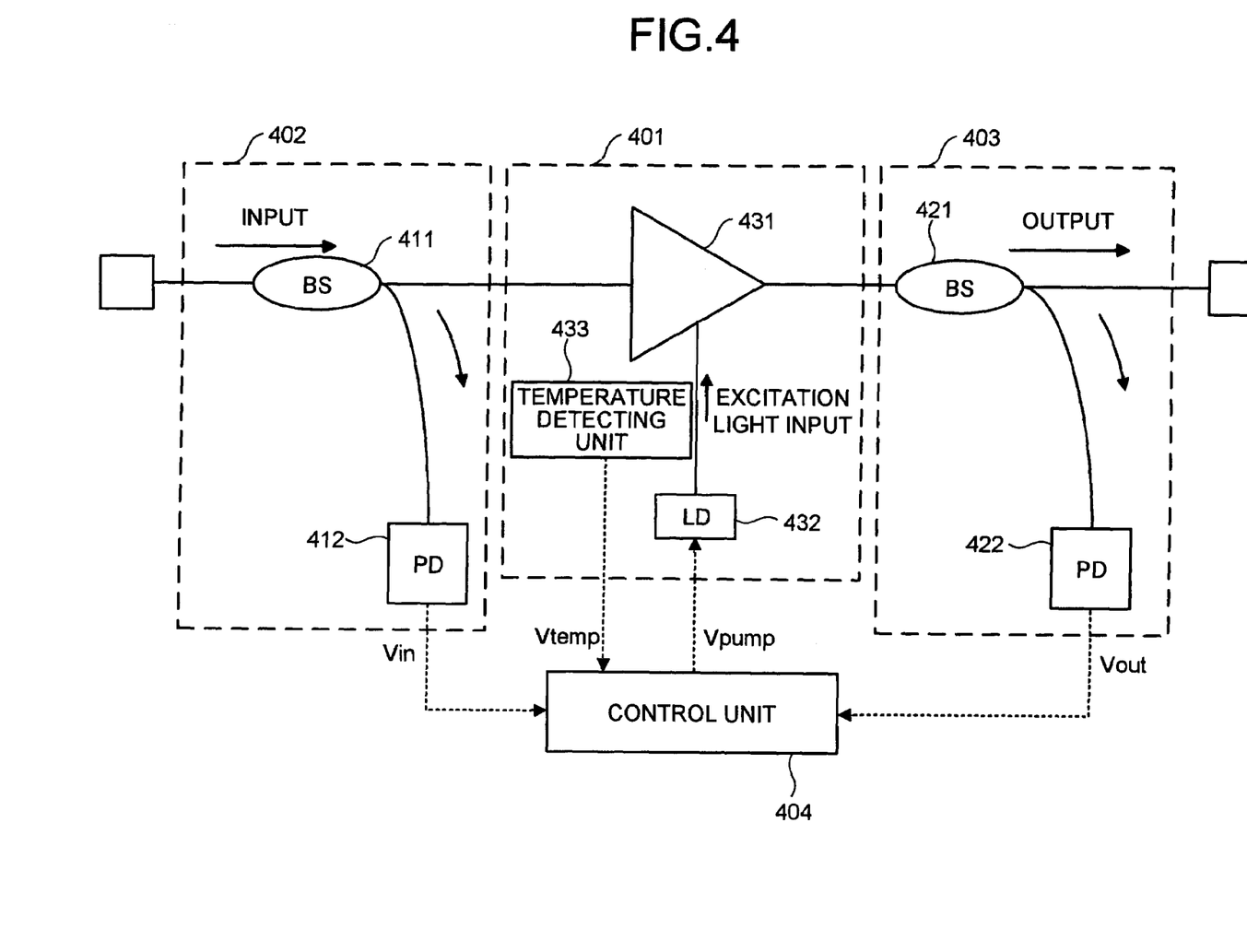
FIG. 4 is a block diagram of a basic constitution of an optical amplifier of the present invention.

FIG. 4 is a block diagram of a basic constitution of an optical amplifier of the present invention. The optical amplifier includes an optical amplifying unit 401, an optical input detecting unit 402, for monitoring an optical signal input into the optical amplifying unit 401, is provided on a fore-stage of the optical amplifying unit 401, and an optical output detecting unit 403 for monitoring an optical signal output from the optical amplifying unit 401 is provided on a post-stage of the optical amplifying unit 401.

The optical input detecting unit 402 has a beam splitter 411 for branching a part of the input optical signal, and a photodiode 412 for detecting a power (level) of the optical signals branched by the beam splitter 411. The optical output detecting unit 403 has a beam splitter 421 for branching a part of the optical signal output from the optical amplifying unit 401, and a photodiode 422 for detecting a power (level) of the optical signals branched by the beam splitter 421.

The optical amplifying unit 401 is composed of an optical amplifier 431 and an excitation LD 432. The optical amplifier 431 can be the EDF 130, and the LD 432 can be the LDs 141 and 142 (see FIG. 1). The optical amplifying unit 401 also includes a temperature detecting unit 433 such as a thermistor for detecting a temperature of the optical amplifier 431.

A control unit 404 controls driving of the excitation LD 432 based on detected signals output from both the optical input detecting unit 402 and the optical output detecting unit 403. Detected signals of the powers of the optical signals detected by the photodiode 412 of the optical input detecting unit 402 and the photodiode 422 of the optical output detecting unit 403 are input into the control unit 404. A detected signal that represents the temperature detected by the temperature detecting unit 433 of the optical amplifying unit 401 is also input into the control unit 404. The control unit 404 calculates the ASE power to be output based on the input/output power of the optical signal for the optical amplifying unit 401 and the temperature of the optical amplifying unit 401. Moreover, the control unit 404 controls driving of the excitation LD 432 based on the calculated ASE power in such a manner that the gain and output of the optical amplifier 431 have predetermined values. As a result, even if there is a change in any one or both of the temperature of the optical amplifier 431 and the signal input power (or the signal output power, or the gain), the fixed gain and output set accurately can be maintained.

The following embodiment explains the ASE correction control in the AGC control. When performing the ASE correction using the AGC control, two methods can be thought. One method includes making the correction based on an input of the optical signal, and the other method includes making the correction based on an output.

Figure 5:
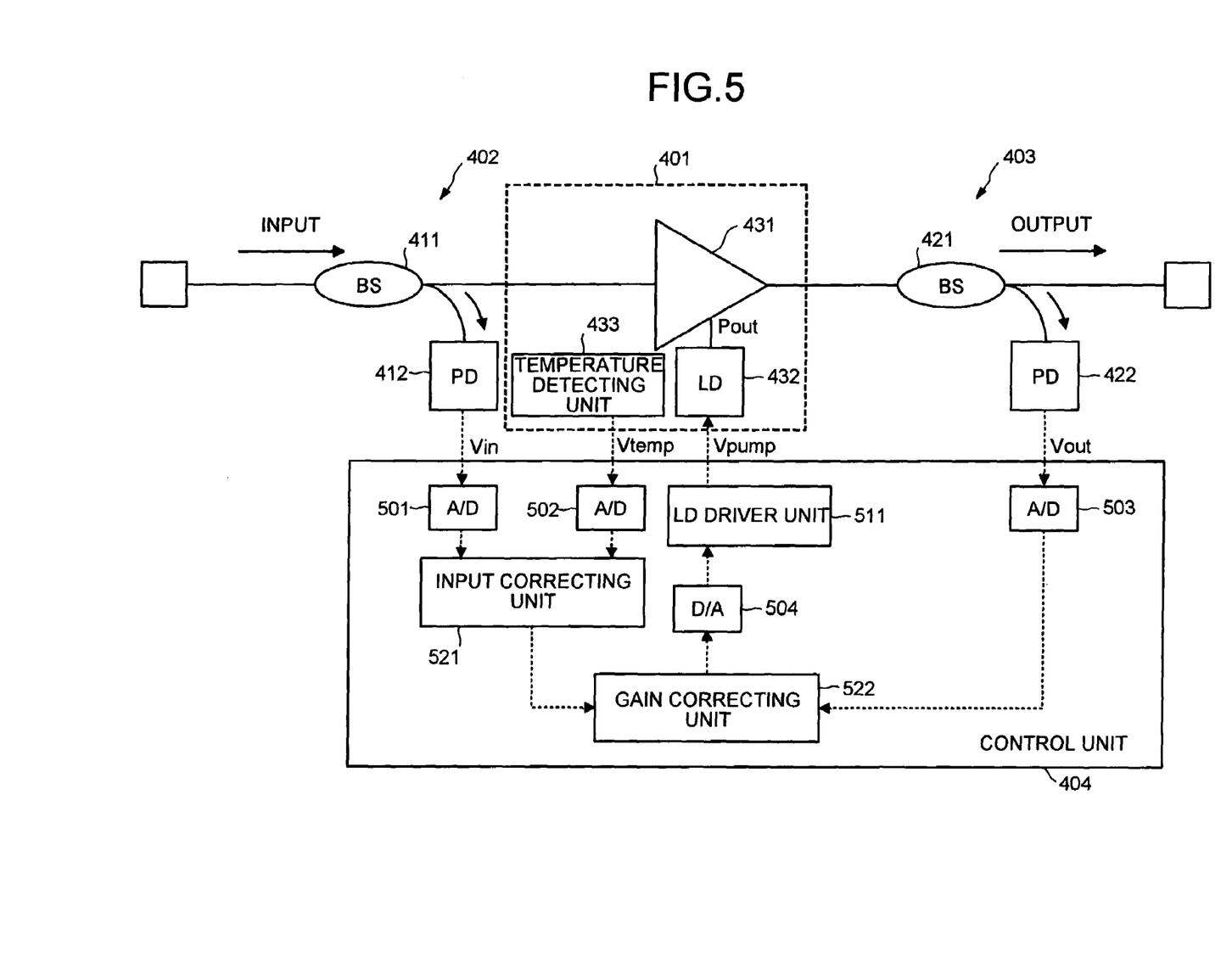
FIG. 5 is a block diagram of a constitution of an optical amplifier according to a first embodiment.

In the first embodiment of the present invention, the ASE correction is performed using the AGC control, and the correction is made based on the input power of the optical signal. FIG. 5 is a block diagram of an optical amplifier according to the first embodiment. The components that have the same configuration or perform the same functions as those in FIG. 4 are designated by the same reference numbers.

The control unit 404 is includes a central processing unit (CPU), a read-only-memory (ROM), a random access memory (RAM) and the like, not shown, and it executes a program so as to execute the ASE correcting process. The detected signals output from the photodiodes 412 and 422 and the temperature detecting unit 433 are supplied to A/D converters 501, 502, and 503, respectively, of the control unit 404. Further, a control signal output from a gain calculating unit 522 as a result of the ASE correcting process is used to control the driving of an LD driver unit 511 via a D/A converter 504, and in turn to control light emission of the excitation LD 432.

The photodiode 412 of the optical input detecting unit 402 outputs an input monitor voltage Vin corresponding to the input power of the optical signal, and the photodiode 422 of the optical output detecting unit 403 outputs an output monitor voltage Vout corresponding to the output power of the optical signal. The temperature detecting unit 433 of the optical amplifying unit 401 outputs a temperature monitor voltage Vtemp corresponding to the temperature of the optical amplifier 431. The LD driver unit 511 outputs an excitation drive voltage Vpump to the excitation LD 432. The excitation LD 432 outputs an excitation LD output Pout corresponding to the excitation drive voltage Vpump to the optical amplifier 431.

The control unit 404 includes an input correcting unit 521 and the gain calculating unit 522. The input monitor voltage Vin, after AD-converting in the A/D converter 501, and the temperature monitor voltage Vtemp, after AD-converting in the A/D converter 502, are input into the input correcting unit 521. The result of the input correction obtained by the input correcting unit 521, and the output monitor voltage Vout, after AD-converting in the AD converter 503, are input into the gain calculating unit 522. The gain calculating unit 522 calculates a control signal for driving the LD driver unit 511 and outputs the control signal to the LD driver unit 511 via the D/A converter 504. The LD driver unit 511 outputs the excitation drive voltage Vpump to the excitation LD 432 based on the control signal from the gain calculating unit 522.

Figure 6:
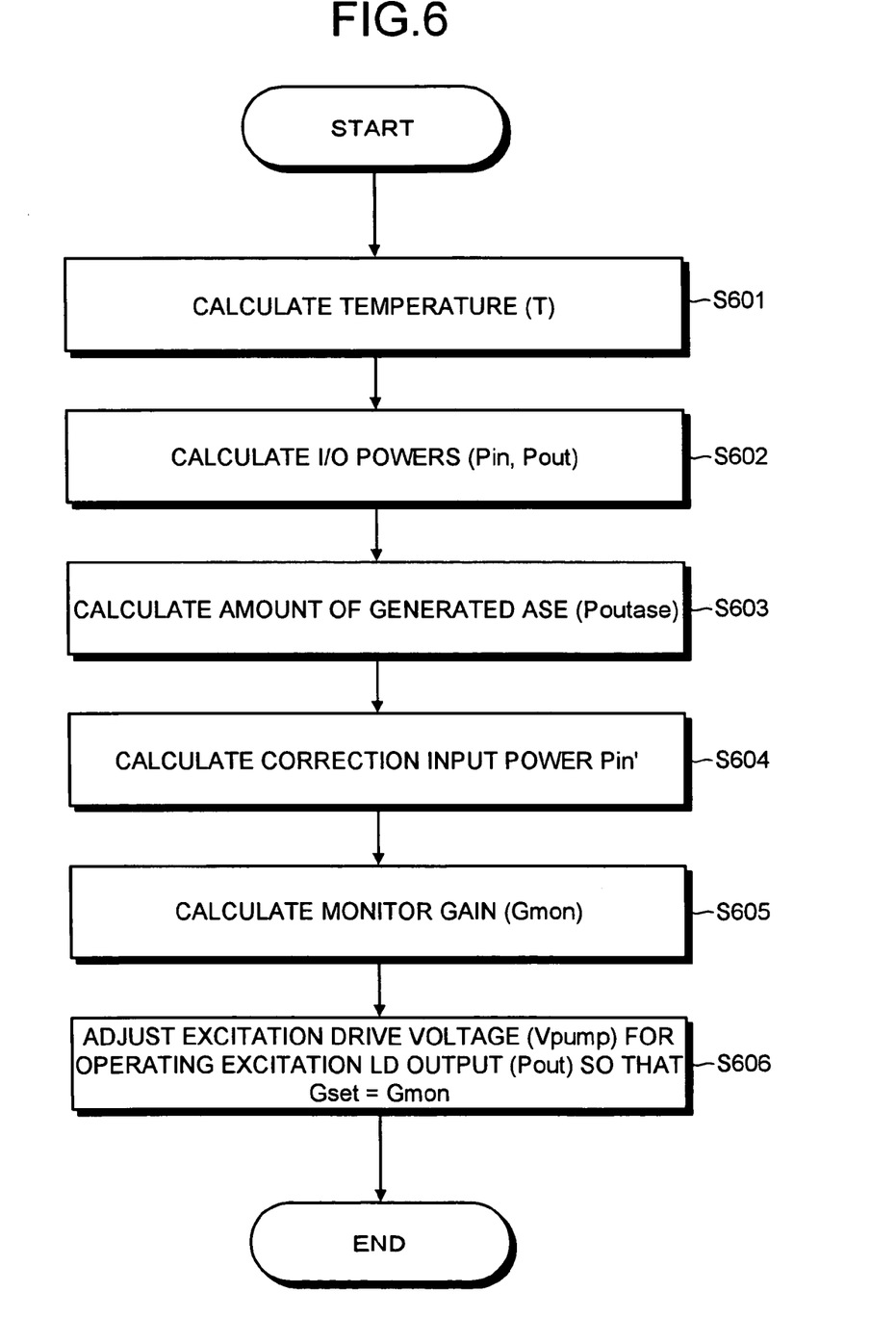
FIG. 6 is a flowchart of a process procedure for performing a gain control of ASE correction according to the first embodiment.

FIG. 6 is a flowchart of a process procedure for performing the gain control for the ASE correction according to the first embodiment. The gain control process is executed by the input correcting unit 521 and the gain calculating unit 522 of the control unit 404. The gain of the optical amplifier 431 can be expressed by equation (1):

$$\text{gain} = \frac{Pout - Poutase}{Pin} \quad (1)$$

$$\approx \frac{Pout}{Pin + \frac{Poutase}{Gset}(Pin, T)}$$

The input correcting unit 521 calculates a temperature T from the temperature monitor voltage Vtemp (step S601). The input correcting unit 521 calculates an input power Pin from the input monitor voltage Vin and the gain calculating unit 522 calculates an output power Pout from the output monitor voltage Vout (step S602). The input correcting unit 521 calculates, using the equation (1), an amount of generated ASE (Poutase) from the temperature T, the input power Pin, the output power Pout, and a set gain Gset set as a fixed value (step S603). The input correcting unit 521 calculates a correction input power Pin' from the input power Pin, the ASE amount Poutase, and the set gain Gset using equation (2) (step S604).

$$Pin' = Pin + \frac{Poutase}{Gset} \quad (2)$$

The gain calculating unit 522 calculates a monitor gain Gmon using equation (3) (step S605).

$$Gmon = \frac{Pout}{Pin'} \quad (3)$$

Finally, the gain calculating unit 522 outputs a control signal to control the LD driver unit 511 to adjust an excitation LD output Pout of the excitation LD 432 so that the monitor gain Gmon is equal to the set gain Gset. Concretely, the gain calculating unit 522 outputs the control signal to adjust an excitation drive voltage Vpump of the LD driver unit 511 for driving the excitation LD 432 (step S606).

Thus, according to the first embodiment, the temperature and the input power (level) of the optical amplifying unit are used as parameters for the ASE correction. As a result, even if there is a change in the temperature and the input power of the amplifying unit, the gain of the optical amplifying unit can always be controlled to be constant.

Figure 7:
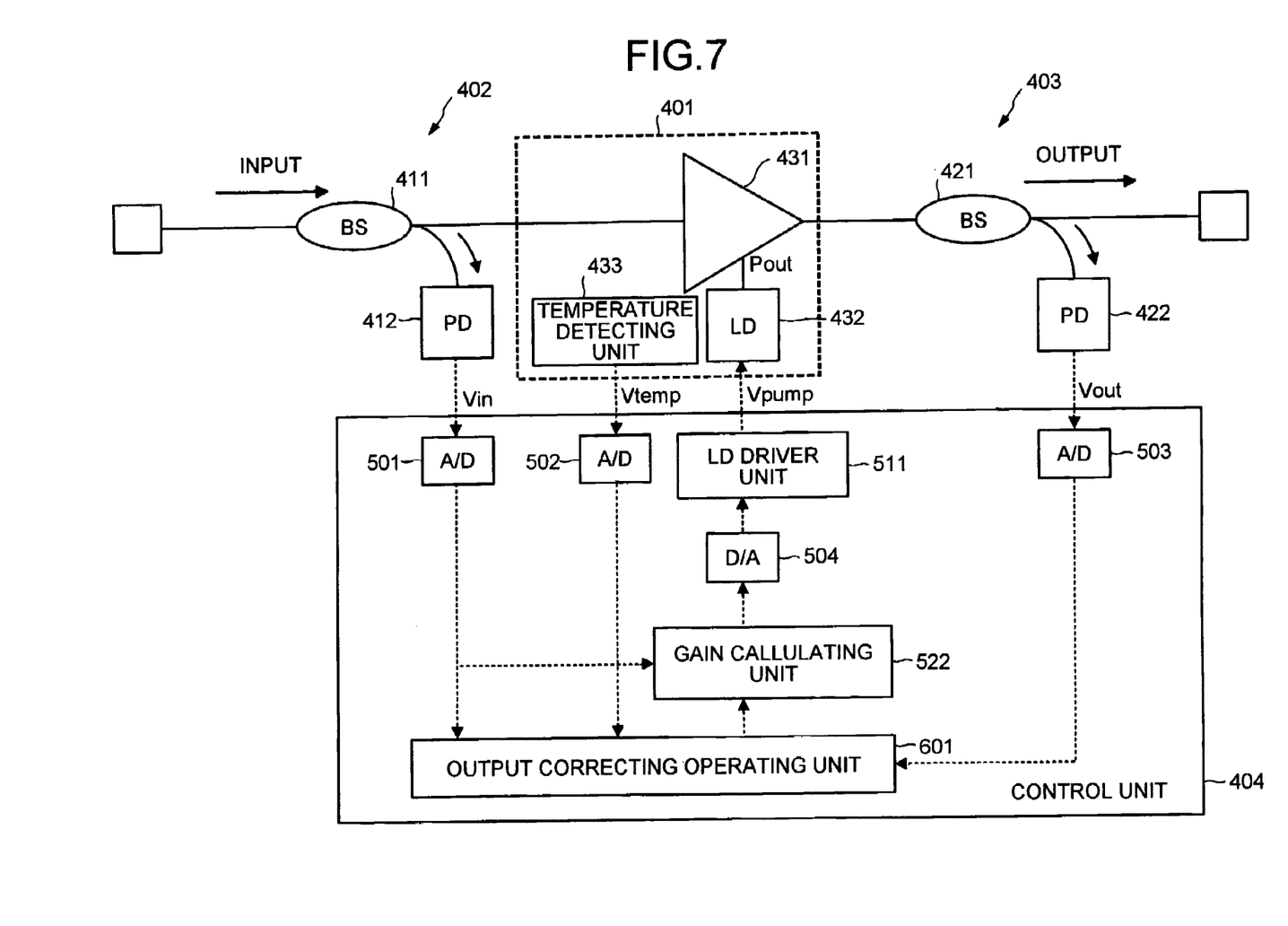
FIG. 7 is a block diagram of an optical amplifier according to a second embodiment.

In a second embodiment of the present invention, the ASE correction is made by the AGC control, and the correction is made based on the output power of the optical signal. FIG. 7 is a block diagram of an optical amplifier according to the second embodiment. In FIG. 7, the components that have the same configuration or perform the same functions as those in the first embodiment (see FIG. 5) are designated by the same reference numbers.

The control unit 404 includes the gain calculating unit 522 and an output correcting unit 601. The input monitor voltage Vin, the temperature monitor voltage Vtemp, and the output monitor voltage Vout are input into the output correcting unit 601 after A/D-converting in respective A/D converters. An output of the output correcting unit 601 and the input monitor voltage Vin, after A/D-converting, are input into the gain calculating unit 522. The gain calculating unit calculates a control signal for driving the LD driver unit 511 and outputs the control signal to the LD driver unit 511 via the D/A converter 504.

Figure 8:
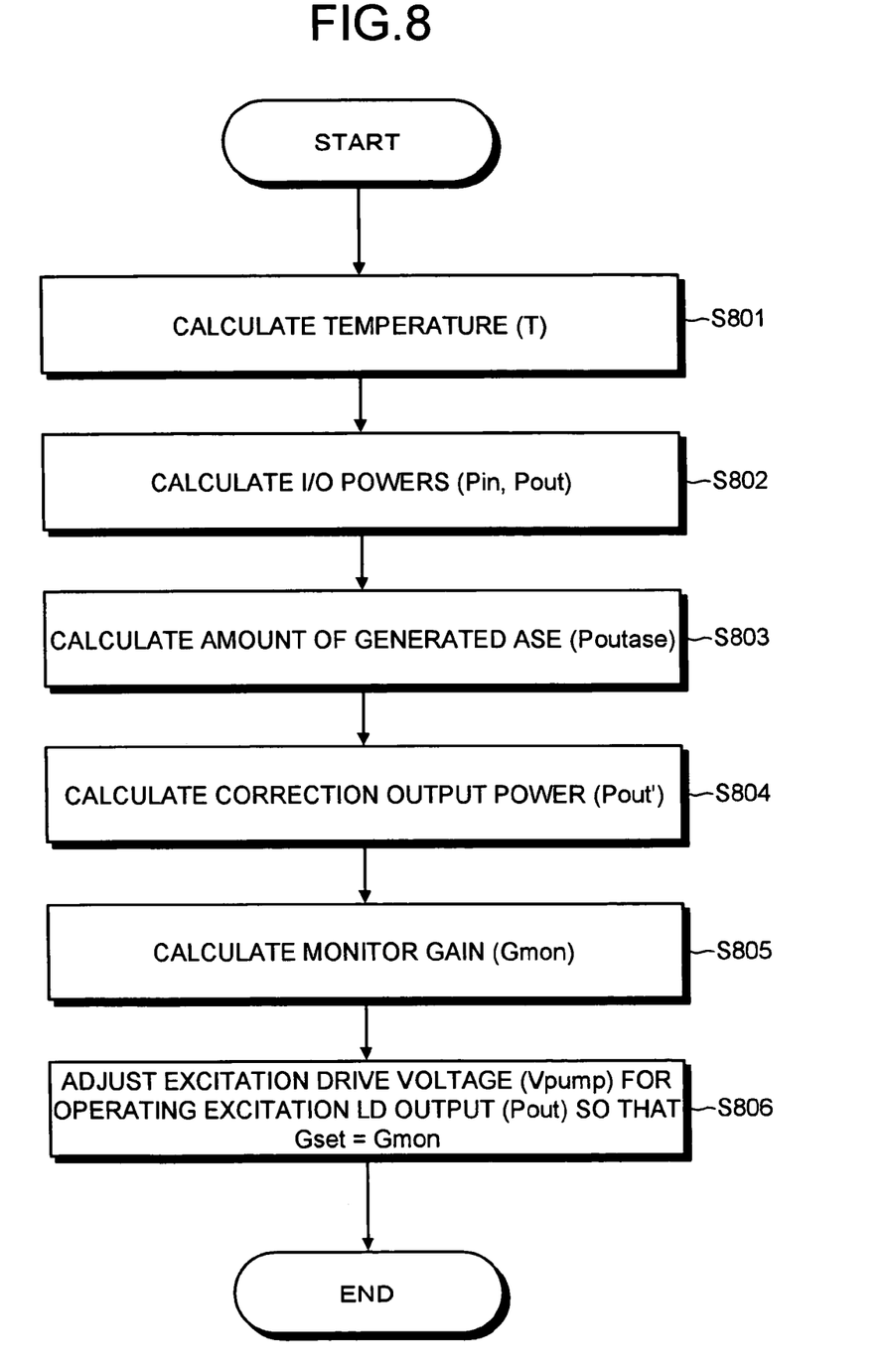
FIG. 8 is a flowchart of a process procedure for gain control of ASE correction according to the second embodiment.

FIG. 8 is a flowchart of a process procedure for performing the gain control for the ASE correction according to the second embodiment. The gain control process is executed by the output correcting unit 601 and the gain calculating unit 522 of the control unit 404.

The output correcting unit 601 calculates the temperature T from the temperature monitor voltage Vtemp (step S801). The output correcting unit 601 calculates the input power Pin from the input monitor voltage Vin and calculates the output power Pout from the output monitor voltage Vout (step S802). The output correcting unit 601 calculates, using the equation (1), the amount of generated ASE (Poutase) from the temperature T, the input power Pin, the output power Pout, and the set gain Gset set as a fixed value (step S803).

The output correcting unit 601 calculates a correction output power Pout' from the output power Pout and the ASE amount Poutase using equation (4) (step S804).

$$Pout' = Pout - Poutase \quad (4)$$

The gain calculating unit 522 calculates a monitor gain Gmon using equation (5) (step S805).

$$Gmon = \frac{Pout'}{Pin} \quad (5)$$

Finally, the gain calculating unit 522 outputs a control signal to control the LD driver unit 511 to adjust an excitation LD output Pout of the excitation LD 432 so that the monitor gain Gmon is equal to the set gain Gset. Concretely, the gain calculating unit 522 outputs the control signal to adjust an excitation drive voltage Vpump of the LD driver unit 511 for driving the excitation LD 432 (step S806).

Thus, according to the second embodiment, the temperature and the input power (level) of the optical amplifying unit are used as parameters for the ASE correction. As a result, even if there is a change in the temperature and the input power of the amplifying unit, the gain of the optical amplifying unit can always be controlled to be constant. Particularly, the gain of the optical amplifier for amplifying a wavelength multiplex signal obtained by multiplexing the optical signals having wavelengths can be controlled so as to be constant. For this reason, optical fiber transmission loss and optical function device loss can be easily compensated.

In the optical amplifier and the control method for the optical amplifier of the present invention, the input power (level) and the temperature are detected, and the ASE correction is made using them as parameters. For this reason, ASE which changes according to the change in the input power and the temperature can be corrected suitably, and a constant gain (output power) can be obtained. The present invention is not limited to detecting both the input power and the temperature, however, and instead can be modified to detect only one of them. Even with such constitution, the ASE correction can be made more suitably than the conventional art.

The control method for the optical amplifier explained in the embodiments can be realized in such a manner that a prepared computer program is executed by a computer such as a personal computer or a work station. This program is recorded into a recording medium readable by a computer, such as a hard disc, a flexible disc, a compact disc read-only memory (CD-ROM), a magneto-optical (MO) disc, or a digital video disc (DVD). The computer program is executed by reading it from the recording medium by the computer. The computer program may be a transmission medium which can be delivered via a network such as internet.

According to the optical amplifier and the control method for the optical amplifier of the present invention, when amplifying an optical signal, a factor that causes a change in gain is detected and that factor is used to control the gain. Therefore, even if there is a change in the temperature or the signal input power of the optical amplifier, a fixed gain that is set can be maintained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical amplifier receiving and amplifying an input optical signal and producing an output optical signal, comprising:
   a power detecting unit that detects at least one of an input power of the input optical signal and an output power of the output optical signal and produces a corresponding power detection output;
   a temperature detecting unit that detects an operating temperature of an erbium-doped fiber (EDF), a change in the operating temperature causing the gain of the optical amplifier to change, and produces a corresponding temperature detection output; and
   a control unit that calculates a power of an amplified spontaneous emission (ASE) based on the power and temperature detection outputs, and adds a power factor that is determined by the power of the ASE to the input power, to maintain the gain of the optical amplifier at a predetermined value;
   the control unit controls the gain to be $$\text{gain} = \frac{Pout}{Pin + \frac{Poutase}{Gset}(Pin, T)}$$

where Pin represents the input power, Pout represents the output power, Gset represents a set gain, Poutase represents the power of the ASE, and T represents the operating temperature of the EDF.

2. The optical amplifier according to claim 1, wherein the power factor depends upon both the input power and the operating temperature of the EDF.

3. The optical amplifier according to claim 1, wherein:
   the power detecting unit detects the input power and the output power, respectively, of the input and output optical signals and produces the corresponding power detection output based on both thereof.

4. The optical amplifier according to claim 1, wherein:
   the control unit controls an excitation laser diode for the EDF.

* * * * *